United States Patent
Wirth et al.

(10) Patent No.: US 6,660,359 B1
(45) Date of Patent: Dec. 9, 2003

(54) FIBER MAT

(75) Inventors: Georg Wirth, Kirchheim (DE); Peter Zacke, Albershausen (DE); Siegfried Woerner, Esslingen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 0 days.

(21) Appl. No.: 09/743,017

(22) PCT Filed: Apr. 21, 1999

(86) PCT No.: PCT/EP99/02684

§ 371 (c)(1),
(2), (4) Date: Feb. 9, 2001

(87) PCT Pub. No.: WO00/00722

PCT Pub. Date: Jan. 6, 2000

(30) Foreign Application Priority Data

Jun. 30, 1998 (DE) .......................... 198 29 110

(51) Int. Cl.⁷ .......................... B32B 5/12; D03D 11/00; D04H 3/02; D04H 3/05
(52) U.S. Cl. .......................... 428/108; 442/206; 442/207; 442/366; 442/269; 442/189; 428/109; 428/37

(58) Field of Search .................................. 442/206, 207, 442/366, 269, 189; 428/109, 108, 37

(56) References Cited

U.S. PATENT DOCUMENTS

| 3,949,109 | A | | 4/1976 | McBride |
| 4,484,459 | A | | 11/1984 | Hutson |
| 6,323,145 | B1 | * | 11/2001 | Popper et al. .............. 428/902 |

FOREIGN PATENT DOCUMENTS

| DE | 35 14 150 C1 | 4/1986 |
| EP | 0 361 796 A2 | 4/1990 |
| EP | 0 824 184 A2 | 2/1998 |

* cited by examiner

Primary Examiner—Ula Ruddock
Assistant Examiner—Jennifer Boyd
(74) Attorney, Agent, or Firm—McGlew and Tuttle, P.C.

(57) ABSTRACT

A fiber mat is configured such that the fibers 2 of an intermediate layer arranged between two adjacent layers touch the fibers of one of the layers at positions situated at a distance from the contact points with the fibers of the other layer. The positioning and the material of the fibers is designed to have a high elasticity with regard to pressing.

20 Claims, 3 Drawing Sheets

FIBER MAT

FIELD OF THE INVENTION

The present invention pertains to a fiber mat, especially one which consists of a material resistant to heat and alternating thermal stress and is especially suitable for holding ceramic monoliths in exhaust systems of internal combustion engines, e.g., engines of motor vehicles, which said exhaust systems are subject to pulsating load.

BACKGROUND OF THE INVENTION

In modern motor vehicles, the exhaust gases of the internal combustion engines used to drive the vehicles are regularly subjected to catalytic aftertreatment in order to convert especially toxic components of the exhaust gases into less toxic substances. The catalytic converter devices typical for this comprise a ceramic monolith, which has a large number of narrow exhaust gas channels, whose walls are coated with a catalytically active material, usually platinum, palladium or rhodium, so that the exhaust gas passing through these channels can interact practically completely with the catalyst material.

The ceramic monolith or the ceramic monoliths are usually accommodated in metal housings, wherein the particular ceramic monolith is mounted by means of a more or less markedly flexible mat, which is arranged within an annular gap between an outer circumferential surface of the ceramic monolith and an inner wall of the housing and fixes the monolith essentially by friction. Moreover, this mounting mat shall compensate inevitable manufacturing tolerances of the ceramic monolith and the metal housing as well as the different coefficients of thermal expansion of the housing and the monolith. The mounting mat may be subject to high alternating stresses partly because the exhaust gas temperatures reach extraordinarily high values compared with the normal temperature of the atmosphere and partly because extreme cooling of the housing compared with the ceramic monolith may occur due to splash water on roads wet from rain or in car washes. In addition, the exhaust gas flow is characterized by pronounced pulsations, which induce vibrations of the wall of the metal housing and continuously subject the ceramic monolith to pulsations on the side on which the exhaust gas enters.

Mounting mats for ceramic monoliths in exhaust systems are currently designed as "very irregular" knitted wire fabrics and/or as so-called expanded mats, which may contain mica particles expanding under heat and ceramic components, especially in the form of fibers.

SUMMARY AND OBJECTS OF THE INVENTION

The primary object of the present invention is to provide fiber mats suitable for mounting ceramic monoliths in exhaust systems with especially high load-bearing capacity and pronounced long-term elasticity.

This object is accomplished according to the present invention by the fibers being arranged in ordered layers, such that the fibers of one layer extend at right angles to the fibers of an adjacent layer or layers. Each fiber of an intermediate layer located between two adjacent layers lies on the fibers of each adjacent layer at a plurality of contact points. The distances between the contact points are, on average, greater than the fiber diameter, wherein the contact points of the fibers with the fibers of one adjacent layer are located predominantly offset from the contact points with the fibers of the other adjacent layer.

The present invention is based on the general idea of designing the fiber mat as a swath of fibers with predominantly ordered fibers, such that two fibers of adjacent layers, which fibers are in contact with one another, lie on a fiber or fibers of the other layers only at a certain distance on their sides facing away from the contact point in question. This ultimately means that contact points and free spaces follow one another alternatingly more or less frequently in the direction of the thickness of the mat, i.e., at right angles to the plane of the mat. Thus, a fiber in a contact point can regularly yield in the direction of a free space located diametrically opposed to the contact point relative to the fiber axis, so that the contact points are located at least predominantly on fiber areas that yield during load under bending. These fibers areas consequently resemble flexible "beams," which are mounted on both sides of a contact point loaded in one direction for support against this load.

According to a preferred embodiment of the present invention, the fiber diameter is between approx. 3 $\mu$m and 15 $\mu$m, the fiber diameter of at least 5 $\mu$m being preferred in order to avoid irritations of the human skin if small fragments are possibly formed and, moreover, to prevent the fiber fragments from being able to be inhaled at a high probability. In the case of mounting mats for ceramic monoliths, vitreous or ceramic metal oxides are preferred as fiber materials because of their high thermal loadability. Even though these are usually extremely brittle materials, high long-lasting elasticity can be guaranteed in the direction of the thickness of the mat because of the fiber swath provided according to the present invention as well as the small fiber diameter.

At least part of the fiber layers may optionally consist of wave-shaped or coiled fibers. As a result, it is possible, on the one hand, to increase the distances between the support points on a fiber. On the other hand, it can be guaranteed relatively easily with such fibers that free spaces, which can be utilized for the bending movements of fibers of adjacent layers, will regularly remain within a fiber layer.

The fibers of the fiber swath are bent in a more or less wave-shaped pattern under pressing load. This leads per se to a corresponding tensile load of the fibers and/or to a shortening of the mat in the longitudinal and transverse directions. This effect can be compensated by the fibers of the mat having a, preferably irregular, wavy shape with a relatively large space wave length and comparatively small space amplitude in the unloaded and unstressed state. The fibers can thus "stretch" somewhat without being subjected to excessive tensile load during the pressing of the mat.

The order of the fiber swath of the mat can be fixed before installation or insertion by bonding and/or by means of auxiliary threads. It is thus possible, in particular, to keep the fiber layers under pretension in the direction of the thickness of the mat by means of auxiliary threads or by the bonding. The insertion or the installation of the mat can be markedly facilitated with such measures.

If the auxiliary threads or the bonding consist of a material which dissolves during heating (or under the effect of other measures), the pressing forces generated by the mat in a gap after the insertion can be increased by the dissolution of the auxiliary threads or the bonding.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
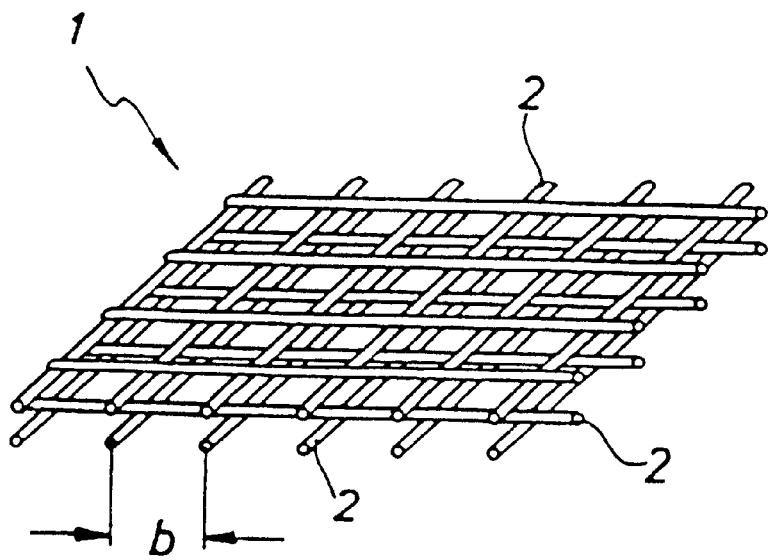
FIG. 1 is a perspective view of a detail of several layers of a fiber mat lying one on top of another.

Referring to the drawings, and in particular to FIG. 1, a fiber mat 1 comprises a plurality of fiber layers lying one on top of another with fibers 2 which are parallel to one another. The fibers in each layer are spaced from another by a dimension b, wherein the fibers of layers directly adjacent to one another are directed at right angles to one another. Even though the fibers 2 of two layers which are arranged on both sides of a layer located between them, e.g., the fibers of the first and third layers from the bottom in FIG. 1, are parallel to one another, they are arranged in relation to one another so as to fill gaps in the top view on the layers. The contact point of a fiber 2 of an intermediate layer with a fiber 2 of an adjacent layer is thus regularly located at a spaced location from adjacent contact points between the above-mentioned fibers and fibers 2 of the other adjacent layer.

Figure 2:
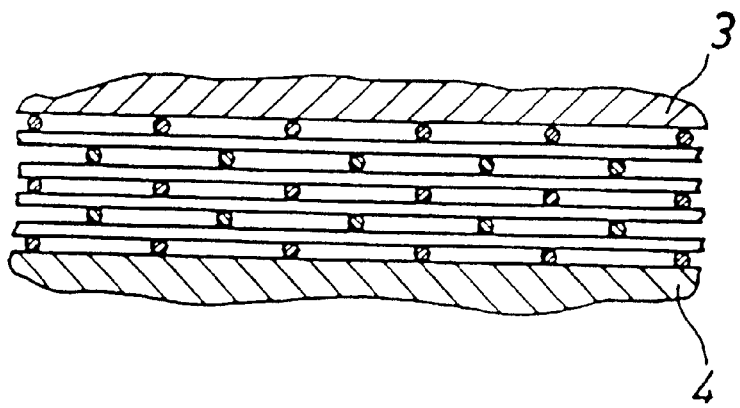
FIG. 2 is a sectional view of a corresponding fiber mat in the unloaded state
Figure 3:
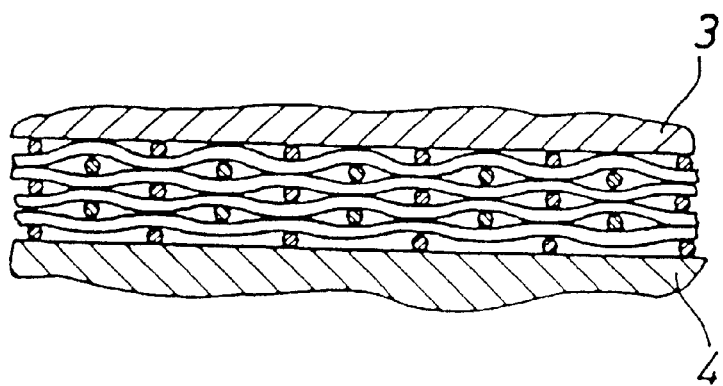
FIG. 3 is a sectional view of the fiber mat under load corresponding to FIG. 2.

If the fiber mat 1 according top FIGS. 2 and 3 is arranged between the walls 3 and 4 of a gap of variable width, an extensively regular wave-shaped deformation of all fibers 2, with the exception of the fibers of the two fiber layers immediately adjacent to the walls 3 and 4 takes place during the narrowing of the gap according to FIG. 3.

In the case of a fiber mat 1 for holding ceramic monoliths in exhaust systems, the fibers 2 may consist of fibers made of ceramic materials, which have a high thermal load-bearing capacity and also withstand alternating thermal stresses, e.g., metal oxides, such as aluminum oxide, silicon oxide, boron oxide, zirconium oxide, hafnium oxide or mixed crystals of these materials, or silicon carbide and silicon nitride. Fiber diameters of about 5 $\mu$m are preferably provided in the case of these materials, and the number of fiber layers may be a multiple of 100.

With such a large number of fiber layers and the small fiber diameters indicated, the fiber mat 1 in the gap between the walls 3 and 4 in FIGS. 2 and 3 offers an extraordinarily great throttling resistance to gases seeking to pass through the gap in parallel to the walls 3 and 4. In addition, good shielding against heat radiation is achieved because of the large number of fibers by volume unit and good thermal insulation of the walls 3 and 4 from one another is achieved because of the many small free spaces between the fibers 2.

If the fiber mat is used to mount a ceramic monolith in exhaust systems, i.e., the gap between the monolith and the housing wall surrounding the monolith is sealed in an extensively gas-tight manner, the monolith and the housing wall are also effectively separated from one another thermally.

Figure 4:
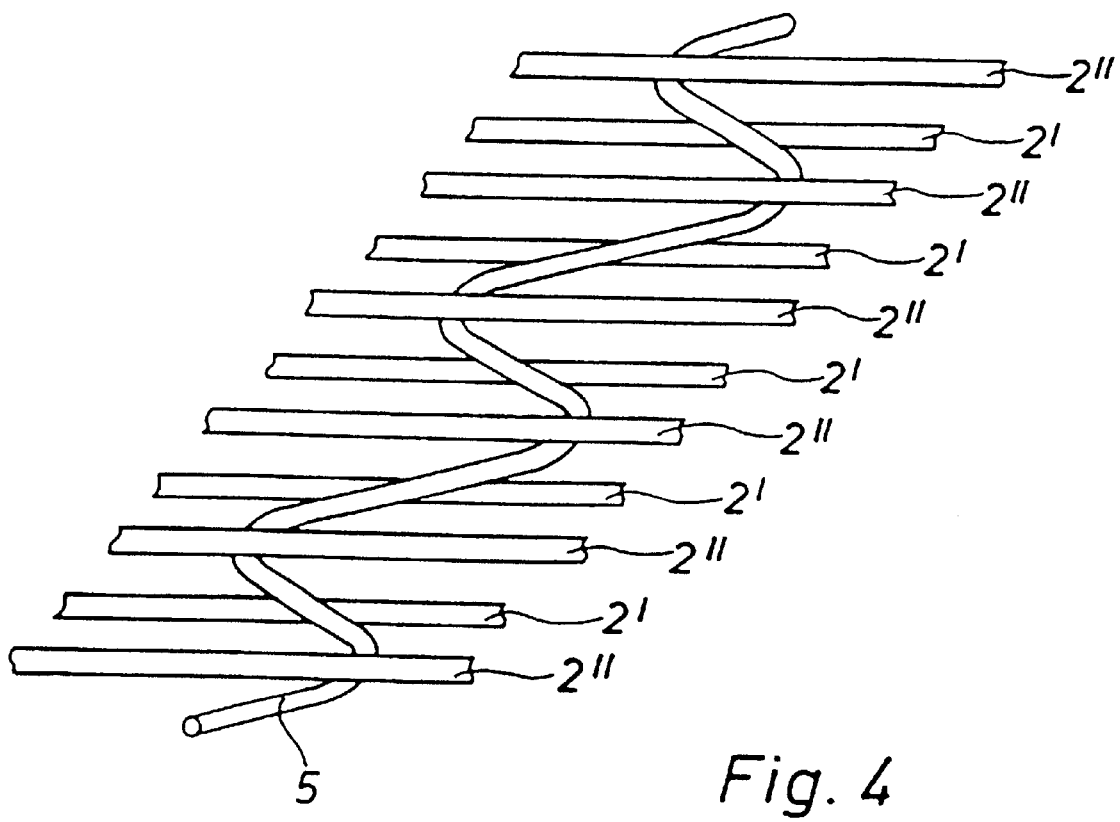
FIG. 4 is a perspective view of a detail of three fiber layers of an embodiment in which the fiber layers alternatingly consist of wave-shaped and straight fibers.

In the embodiment according to FIG. 4, a layer with wave-shaped fibers 5 is arranged between two fiber layers with respective fibers 2' and 2", which are parallel to one another but are offset in parallel, wherein the fibers 5 form a flat wave located in the plane of the layer with a space wave length that corresponds to twice the distance between adjacent fibers 2' and between adjacent fibers 2". The fibers 2" are preferably located such that they cross the wave-like fibers 5 approximately at the extreme points of the wave, while the fibers 2' touch the wave-shaped fibers in the area in which the curvature changes.

Due to this configuration, the wave-shaped fibers 5 are subject to bending and torsional stress under pressure load on the fiber mat. In addition, the contact points between a fiber 5 and adjacent fibers 2' and 2", which contact points follow one another in the direction of the fiber, are spaced relatively widely from one another. The probability of fiber breaks can be reduced as a result.

Figure 5:
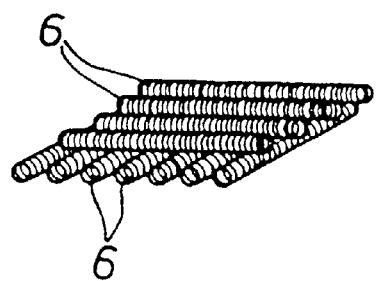
FIG. 5 is a perspective view of a detail of a fiber mat, whose fiber layers consist of coiled fibers.

In the embodiment according to FIG. 5, the fiber layers consist of tubular fiber coils 6, where the fiber coils of one layer may be arranged at right angles to the direction of the fiber coils of the adjacent layer. Such a fiber mat is characterized by high flexibility. In addition, good elasticity is guaranteed in the direction of the thickness because, on the one hand, the fiber coils 6 can be squeezed elastically at right angles to the coil axis, and, on the other hand, it is possible, at least in the case of fiber coils 6 with greater pitch, for adjacent fiber coils 6 or the fiber coils 6 of adjacent layers to be pressed into one another.

Figure 6:
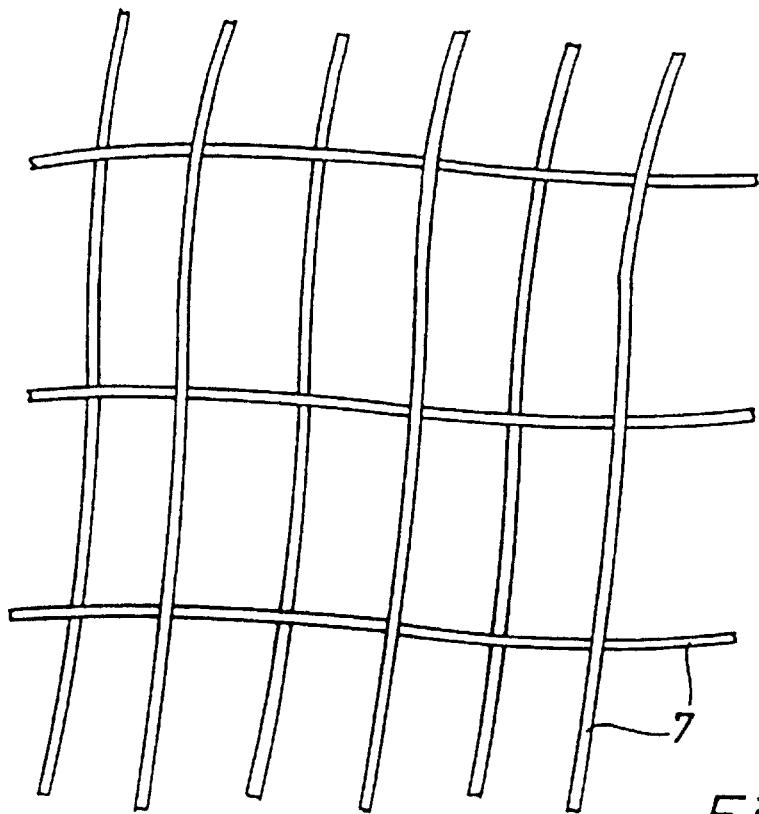
FIG. 6 is a schematic top view of three fiber planes which consist of slightly wave-shaped fibers each.

According to FIG. 6, the fiber layers may consist of slightly wavy fibers 7, whose space wave length is markedly greater than twice the transverse distance between the fibers 7 of the adjacent layer in question. Even if the laying of the fibers 7 is performed with low accuracy, such wavy fibers 7 make it possible at a high degree of probability for the fibers of two fiber layers directly adjacent to an intermediate layer to have mutually offset contact points with the fibers of the intermediate layer in the transverse direction and for a free space that can be used for the bending of the fiber 7 to be thus present in the area of a contact point of two fibers 7 belonging to different layers on the side of a fiber 7 facing away from the corresponding contact point.

Due to the waviness of the fibers, it can be achieved relatively easily during their laying that a mean distance is left between adjacent fibers of one layer or only punctiform contacts will be formed.

The preferably irregular waviness of the fibers may preferably have a space wave length in the range corresponding to 100 times to 500 times the dimension of the fiber diameter. The space amplitude of the waviness is preferably 10 times to 100 times the dimension of the fiber diameter.

Figure 7:
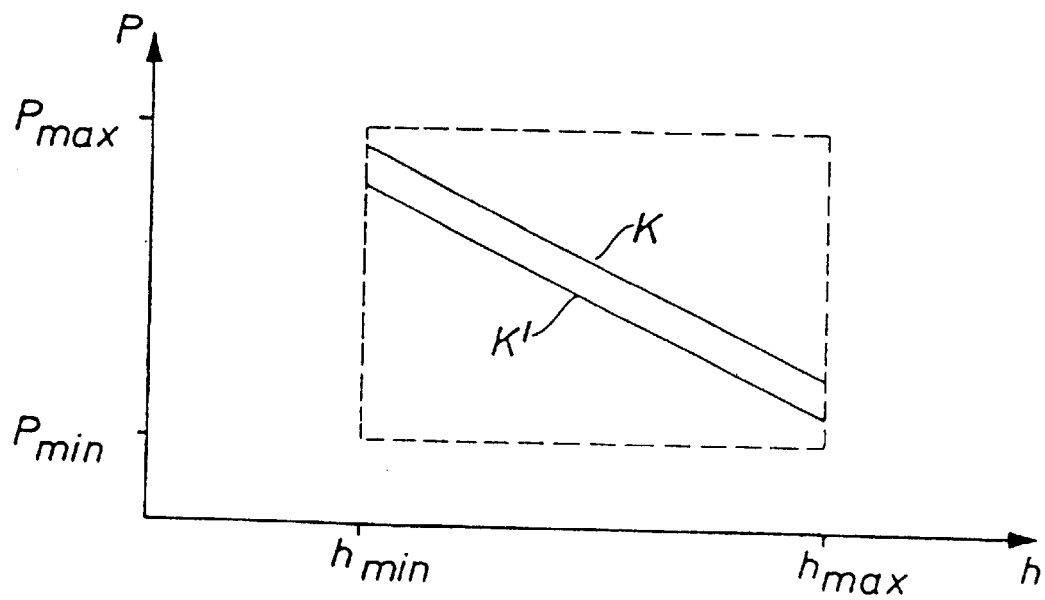
FIG. 7 is a diagram showing the pressing of a fiber mat as a function of the height of a gap filled by the fiber mat.

FIG. 7 shows a diagram showing the pressing P of a fiber mat as a function of the height h of a gap filled by the fiber mat, the fiber mat having a structure similar to that in FIG. 1. An extensively linear compression characteristic K is obtained within a useful area indicated by dotted line, and this characteristic is shifted in the course of time in the direction of a characteristic K' that is essentially parallel to the compression characteristic K because of inevitable fiber breaks. The slope of the characteristics K and K' is determined by the transverse distances between the fibers 2 within the fiber layers as well as the fiber diameter and the fiber material. Shorter transverse distances as well as increased fiber diameters lead to a greater slope of the characteristics K and K'.

In the case of a fiber mat for mounting a ceramic monolith, the useful area for the pressing is limited downward by the minimum pressing $P_{min}$ that is necessary to bring about a frictional engagement between the fiber mat and the monolith or between the fiber mat and the housing of the monolith that is sufficient for the fixation of the monolith. The useful area is limited upward during pressing by the maximum allowable pressing $P_{max}$ for the monolith above which breaks of the monolith are to be expected.

Concerning the gap height h, it must be guaranteed, on the one hand, that the actual value is not lower than the value $h_{min}$ below which an excessively large number of fiber breaks must be expected due to intense squeezing of the fiber mat. On the other hand, the gap width must not exceed the value $h_{max}$, above which the fibers of the fiber layers are subject to bending stress only slightly, so that only a progressively decreasing pressing can be expected with increasing gap height.

The methods known from the weaving technique may be used, in principle, to manufacture the fiber mats.

To avoid slipping of the fibers of an unloaded fiber mat, adhesives may be used, with which the fibers are wetted before they are laid to form the fiber mat.

In the case of a fiber mat intended for mounting ceramic monoliths in exhaust systems, adhesives that can be burned out, e.g., adhesives based on starch acetate or polyvinyl acetate or acrylates, may be preferably used.

The bonding of the fibers with one another may optionally also be performed in a pretensioned state of the fiber mat.

Even though it is advantageous, in principle, concerning the strength and the loadability of the mat for the fibers to extend from one edge of the mat to the other edge of the mat without interruption, the fiber swath forming the mat may also consist of many, relatively short fiber pieces, which are arranged and designed in this case corresponding to the views in FIGS. 1 through 6, because the strength of the mat in the longitudinal direction and the transverse direction is of secondary importance only in the case of a mounting mat for ceramic monoliths in exhaust systems of internal combustion engines and essentially only the loadability of the mat at right angles to the plane of the mat is important.

Since the fiber mat according to the present invention consists of a swath of fibers, it is relatively easily possible to design the fiber mat with different numbers of layers in the different areas in order to prevent the housing wall from separating from the mounting mat in especially flexible areas of the housing wall, e.g., in the case of the mounting of a ceramic monolith in a corresponding housing of an exhaust system. This may be important especially if the ceramic monolith and the corresponding housing have a nonround cross section with greatly curved parts in some areas and slightly curved parts in some areas. In the slightly curved zones, the housing wall can perform comparatively large elastic bulging movements, which lead to a correspondingly great change in the gap height. If the fiber mat has an increased number of layers in such areas, firm mounting of the monolith as well as good damping of the vibrations of the wall and good sealing of the gap can be guaranteed everywhere.

It is also possible, in principle, to fix the net grid and space grid structure of the fiber mat or of the fiber layers in the longitudinal and transverse directions and in the direction of the thickness of the mat by means of auxiliary fibers, which may be woven, e.g., in a zigzag pattern into the net structure. However, the density of the auxiliary fibers shall be comparatively low in order for them to interfere with the net structure designed to impart elasticity to the fiber mat as little as possible.

Auxiliary fibers that can be burned out may also be inserted between the fibers of the mat or woven in as spacers or binders made from plastics softening under heat. Such auxiliary fibers may be bonded by heat to the ceramic fibers or may be melted into the mat structure as means for fixing the position of the ceramic fibers. The auxiliary fibers may be thicker than the ceramic fibers. For example, acrylic, polyethylene and/or polyamide fibers are suitable for use as such auxiliary fibers.

Some of the fibers provided in the above exemplary embodiments have a more or less pronounced waviness in the unloaded state. These fibers can be prepared and the waviness can be generated by pressure pulsation during the extrusion of the fibers, by a pulsating pulling force during the stretching of the fiber blank, by means of asymmetric nozzles with oscillatingly varied speed of passage of the fiber material and/or by an oscillating deflection of the fiber blanks during the solidification of the fiber material. It is also possible, in principle, to alternatingly modify the fiber blanks by thermal or chemical processes to obtain the wavy shape. To lay the fibers in an ordered manner to prepare the fiber swath, the fibers may be led through combs or the like during the laying. In addition or as an alternative, the fibers may also be passed through laminar air curtains or air jets.

It is advantageous, in principle, in all embodiments of the present invention to fix the fibers of the fiber mat by means of auxiliary measures, e.g., by means of auxiliary threads or by bonding until the insertion or installation of the mat. Provisions are made in an especially preferred manner for exposing the mat to a greater pretension in the direction of the thickness. For example, the fiber layers can be "stitched" together under pretension when auxiliary threads are used. If the materials used to fix the fibers are soluble under heat or in another manner, it is possible to remove the fixing material after the mounting or installation of the mat, so that the pressing forces generated by the mat in a gap or the like are markedly increased. At the same time, it is achieved through these measures that the mat can be arranged especially easily in the gap or the like because the pressing forces between the mat and the walls of the gap are kept low at first as long as the fixation of the fiber layers remains effective under pretension.

Even though the fiber mats according to the present invention are preferably intended for use as mounting mats for ceramic monoliths in exhaust systems of internal combustion engines, the fibers correspondingly consist of materials with high thermal loadability, as was explained above.

However, other applications of the mats according to the present invention are also conceivable. These mats are advantageous whenever high elasticity under pressing load on the mat is important. The mats according to the present invention are therefore also suitable for mounting vibrating machines.

While specific embodiments of the invention have been shown and described in detail to illustrate the application of the principles of the invention, it will be understood that the invention may be embodied otherwise without departing from such principles.

What is claimed is:

1. A fiber arrangement comprising:
   a first layer including a plurality of fibers extending in a first direction;

a second layer arranged adjacent said first layer, said second layer including a plurality of fibers extending in a second direction, said second direction being substantially perpendicular to said first direction;

a third layer arranged adjacent said second layer, said third layer including a plurality of fibers extending in a third direction, said third direction being substantially perpendicular to said second direction, each of said fibers of said second layer being in contact with said fibers of said first and third layers at a plurality of contact points, said contact points being spaced from each other by an averse distance greater than a diameter of said fibers, said contact points between said fast and second layers being offset relative to said contact points between said second and third layers;

a first surface on one side of said layers;

a second surface spaced from said first surface and on a second opposite side of said layers, said first and second surfaces being movable relative to each other, and said first, second and third layers elastically biasing said first and second surfaces apart.

2. The arrangement in accordance with claim 1, wherein:
said first surface is a first part of an exhaust system of an engine;
said second surface is a second part of said exhaust system.

3. The arrangement in accordance with claim 1, wherein:
said first surface is an inner surface of a pulse loaded exhaust system of an internal-combustion engine;
said second surface is a ceramic monolith in said exhaust system.

4. The arrangement in accordance with claim 1, wherein:
said average distances between said contact points are a multiple of said diameter of said fiber.

5. The arrangement in accordance with claim 1, further comprising:
a plurality of said layers alternately arranged adjacent to each other to form a fiber mat with a thickness greater than said diameter of fibers by a plurality of orders of magnitude of said diameters of said fibers.

6. The arrangement in accordance with claim 1, further comprising:
a plurality of said layers alternately arranged adjacent to each other, said fibers of every other said layer having a wave shape.

7. The arrangement in accordance with claim 1, wherein:
said average distance between said fibers of one said layer is of a magnitude to cause a maximum allowable tensile stress within said fibers when said fibers bend to come into contact with said fibers of an adjacent layer having a same direction of said fibers.

8. The arrangement in accordance with claim 1, wherein:
said fibers are geometrically fixed relative to themselves under a pretension by one of an auxiliary thread which can be burned out and an adhesive which can be burned out.

9. The arrangement in accordance with claim 1, wherein:
said layers are geometrically fixed relative to themselves under a pretension by one of an auxiliary thread which can be burned out and an adhesive which can be burned out.

10. The arrangement in accordance with claim 1, wherein:
a bond binds one of said fibers and said layers together under a pressing pretension, said bond being soluble under heat.

11. The arrangement in accordance with claim 1, wherein:
a thickness of said fibers is between 3 $\mu$m and 15 $\mu$m.

12. The arrangement in accordance with claim 1, wherein:
said diameter of the fibers has a magnitude of approx. 5 $\mu$m.

13. The arrangement in accordance with claim 1, wherein:
said fibers include one of a vitreous and a ceramic material.

14. The arrangement in accordance with claim 1, wherein:
said fibers include metal oxides.

15. The arrangement in accordance with claim 1, wherein:
said fibers include one of aluminum oxide, silicon oxide, boron oxide, zirconium oxide and hafnium oxide.

16. The arrangement in accordance with claim 1, wherein:
said fibers include a material selected from the group consisting of mixed crystals of metal oxides, silicon carbide, and silicon nitride.

17. The arrangement in accordance with claim 3, wherein:
said average distances between said contact points are a multiple of said diameter of said fiber;

a plurality of said layers are alternately arranged between said first and second surfaces to form a fiber mat with a thickness greater than said diameter of fibers by a plurality of orders of magnitude of said diameters of said fibers, said fibers of every other said layer having a wave shape;

said layers have alternately substantially straight fibers and said wave-shaped fibers, wherein said substantially straight fibers are in contact with one side of one adjacent said layer including wave-shaped fibers in an area of extreme points of waves on said wave-shaped fibers, while said substantially straight fibers of another adjacent said layer are in contact with the layer including said wave-shaped fibers at points of said wave-shaped fibers where curvature of said waves change;

a portion of said plurality of said fibers are helically coiled;

said average distance between said fibers of one said layer is of a magnitude to cause a maximum allowable tensile stress within said fibers when said fibers bend to come into contact with said fibers of an adjacent layer having a same direction of said fibers;

one of said fibers and said layers are geometrically fixed relative to themselves under a pretension by one of auxiliary threads which can be burned out and an adhesive which can be burned out;

a thickness of said fibers is between 3 $\mu$m and 15 $\mu$m;

said fibers include one of a vitreous material, a ceramic material, a metal oxide, mixed crystals of metal oxides, silicon carbide, and silicon nitride;

said offset of said contact points are in a plane of said layers.

18. An arrangement in accordance with claim 3, wherein:
said inner surface is a housing of said exhaust system;
said first and second surfaces are movable toward and away from each other.

19. A fiber arrangement comprising:
a first layer including a plurality of fibers extending in a first direction;
a second layer arranged adjacent said first layer, said second layer including a plurality of fibers extending in a second direction, said second direction being substantially perpendicular to said first direction;

a third layer arranged adjacent said second layer, said third layer including a plurality of fibers extending in a third direction, said third direction being substantially perpendicular to said second direction, each of said fibers of said second layer being in contact with said fibers of said first and third layers at a plurality of contact points, said contact points being spaced from each other by an average distance greater than a diameter of said fibers, said contact points between said first and second layers being offset relative to said contact points between said second and third layers;

said layers having alternately substantially straight fibers and wave-shaped fibers, wherein said substantially stub fibers of one said layer are in contact with one side of one adjacent sad layer including wave-shaped fibers in an area of extreme points of waves on said wave-shaped fibers, while said substantially straight fibers of another said layer are in contact with another side of said layer including said wave-shaped fibers at points of said wave-shaped fibers where curvature of said waves change.

20. A fiber arrangement comprising:

a first layer including a plurality of fibers extending in a first direction;

a second layer arranged adjacent said first layer, said second layer including a plurality of fibers extending in a second direction, said second direction being substantially perpendicular to said first direction;

a third layer arranged adjacent said second layer, said third layer including a plurality of fibers extending in a third direction, said third direction being substantially perpendicular to said second direction, each of said fibers of said second layer being in contact with said fibers of said first and third layers at a plurality of contact point, said contact points being spaced from each other by an average distance greater than a diameter of said fibers, said contact points between said first and second layers being offset relative to said contact points between said second and third layers, a portion of said plurality of said fibers being helically coiled.

* * * * *